(No Model.)

R. M. HUNTER.
ELECTRIC MOTOR AND GENERATOR.

No. 472,708. Patented Apr. 12, 1892.

Attest
Geo. D. Bauer
S. J. Yerkes

Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC MOTOR OR GENERATOR.

SPECIFICATION forming part of Letters Patent No. 472,708, dated April 12, 1892.

Application filed November 12, 1891. Serial No. 411,672. (No model.)

*To all whom it may concern:*

Be it known that I, RUDOLPH M. HUNTER, of the city and county of Philadelphia, and State of Pennsylvania, have invented an Improvement in Electric Motors or Generators, of which the following is a specification.

My invention has reference to electric motors or generators; and it consists of certain improvements which are fully set forth in the following specification and shown in the accompanying drawings, which form a part thereof.

This application (Case No. 212) has particular reference to the construction of electric motors wherein there is a difference in speed required and in which the direction of rotation of the armature is changed from time to time.

In many electric motors there is considerable difficulty from sparking at the commutators unless the brushes are constantly shifted for variations in speed and change in the direction of rotation of the armature.

The object of my invention is to provide means which will permit the brushes to be maintained at fixed points while changing the direction of rotation of the armature or when varying the speed.

Figure 1:
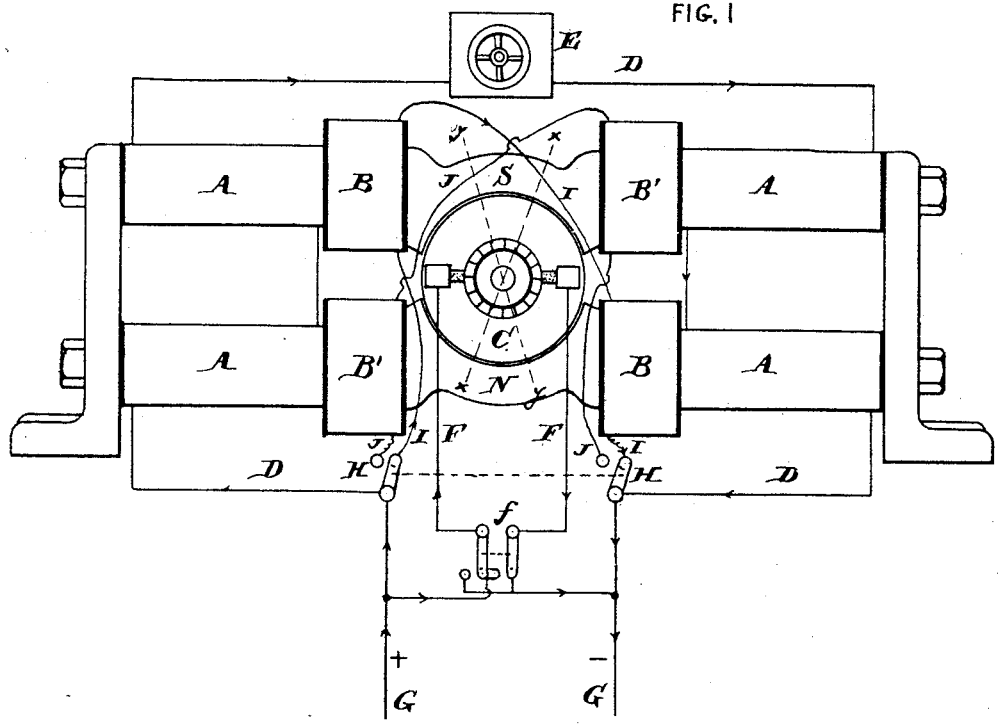
Figure 2:
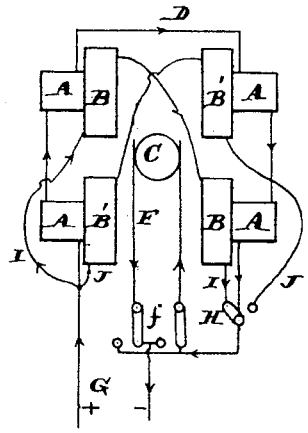

Referring to the drawings, Figure 1 is an elevation of an electric motor and its connecting-circuits; and Fig. 2 is a view, diagrammatically illustrated, showing a modification.

A are the field-magnets proper, and S and N are the pole-pieces thereof.

C is the armature, and may be of any ordinary construction.

T T are the two brushes operating in connection with the commutator.

G is the main circuit and connects the field-magnet circuit D in parallel with the armature-circuit F, the latter being provided with a current-reverser switch $f$. The field-magnet circuit D is provided with a resistance-changer E for regulation. Upon each of the arms of the field-magnets (which are composed of two horseshoe-magnets having the south poles united and the north poles united) I arrange coils B B and B' B' and connect them in pairs by circuits I and J, respectively.

H H are switches for controlling the current in the coils B B', so as to throw the current either through the coils B or through the coils B'. If the coils B have a current passing through them, as indicated, the poles of the motor will be somewhat distorted, so that the magnetic poles which were before in the vertical line through the armature-shaft will now assume a position in a line corresponding to the dotted line $y\ y$. This distortion should be substantially equal to what would be the angular displacement necessary in the brushes to insure the proper running of the motor without sparking. By this means the brushes T may be arranged exactly between the north and south poles of the motor. If the motor is to run in the opposite direction, the switches H are shifted so that the coils B are cut out, while the coils B' are thrown into circuit, in which case the distortion will be to the dotted line $x\ x$, corresponding to the angular displacement necessary to the brushes in the opposite direction, again permitting the brushes to be maintained in a fixed position between the poles of the motor. It is quite evident that in place of cutting one of these sets of coils B or B' out a current may be sent in the opposite direction through said coils, producing a demagnetizing effect upon the corresponding field-pole, and thereby reduce the size of the coils required; but this does not change the general feature of my invention.

It will be seen that upon reversing the motor the switches are so operated as to distort the field to such an extent that the brushes may be maintained in a fixed position without materially sparking at the commutators.

In the diagram shown in Fig. 2 we have the field-magnets and armature coupled in series as distinguished from the parallel connection in Fig. 1. The coils B and B' are alternately thrown in and out of circuit, as before. The particular shape of the electric motor is unimportant, and this may be varied to suit the fancy of the designer, and I therefore do not limit myself to the mere details herein shown.

Having now described my invention, what I claim as new, and desire to secure by Letters Patent, is—

1. An electric motor or generator having a revolving armature arranged between two poles, combined with distorting-coils upon the field-magnets, electric circuits independent of the armature for causing the current to flow through the said distorting-coils, and switches independent of the armature-circuit for controlling the flow of the current through the said coils, whereby the magnetic poles of the electric motor or generator may be distorted to permit the reversal of the armature or change of speed thereof without shifting the brushes.

2. In an electric motor or generator, the combination of two horseshoe field-magnets uniting in the polar portions thereof, a revolving armature arranged between the polar portions, polar distorting-coils arranged upon each of the horseshoe-magnets adjacent to the poles and coupled diagonally in pairs, and independent switches to cause the current to flow through said distorting-coils alternately in pairs, whereby the magnetic poles may be shifted or distorted upon changing the rotation of the armature or the speed thereof to avoid the necessity of shifting the brushes.

3. In an electric motor or dynamo, the combination of an armature, stationary brushes therefor, pole-pieces having four cores arranged in pairs, magnetizing-coils upon said cores to maintain the magnetic field of the machine, distorting-coils arranged upon the cores adjacent to the pole-pieces, and circuits and switches independent of the armature-circuit for causing a current to flow through said distorting-coils diagonally in pairs.

4. In an electric motor or dynamo, the combination of an armature, stationary brushes therefor, pole-pieces having four cores arranged in pairs, magnetizing-coils upon said cores to maintain the magnetic field of the machine, distorting-coils arranged upon the cores adjacent to the pole-pieces, and circuits and switches independent of the armature-circuit for causing a current to flow through said distorting-coils diagonally in pairs and maintaining them in shunt relation with respect to the armature.

In testimony of which invention I have hereunto set my hand.

R. M. HUNTER.

Witnesses:
S. T. YERKES,
ERNEST HOWARD HUNTER.